US012732785B2

(12) United States Patent
Shete et al.

(10) Patent No.: US 12,732,785 B2
(45) **Date of Patent: *Sep. 8, 2026**

(54) PROVISION OF VIRTUAL INFRASTRUCTURE INFORMATION THROUGH R1 INTERFACE

(71) Applicant: RAKUTEN MOBILE, INC., Tokyo (JP)

(72) Inventors: Pankaj Shete, Tokyo (JP); Awn Muhammad, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 344 days.

This patent is subject to a terminal disclaimer.

(21) Appl. No.: 18/289,917

(22) PCT Filed: Apr. 28, 2022

(86) PCT No.: PCT/JP2022/019352

§ 371 (c)(1),
(2) Date: Nov. 8, 2023

(87) PCT Pub. No.: WO2023/209972

PCT Pub. Date: Nov. 2, 2023

(65) Prior Publication Data

US 2024/0244411 A1 Jul. 18, 2024

(51) Int. Cl.
*H04W 4/50* (2018.01)
*H04L 41/052* (2022.01)
(Continued)

(52) U.S. Cl.
CPC ............. *H04W 4/50* (2018.02); *H04L 41/052* (2022.05); *H04L 41/0895* (2022.05);
(Continued)

(58) Field of Classification Search
CPC ... H04L 41/0823; H04L 41/0894–0895; H04L 41/16; H04L 41/40;
(Continued)

(56) References Cited

U.S. PATENT DOCUMENTS

2021/0184989 A1* 6/2021 Wu ....................... H04L 47/762
2021/0258866 A1* 8/2021 Chou .................... H04W 24/02
(Continued)

FOREIGN PATENT DOCUMENTS

JP 2021-083058 A 5/2021
WO WO-2022221260 A1 * 10/2022 ........... H04L 41/342

OTHER PUBLICATIONS

O-RAN Working Group 2, "O-RAN non-RT RIC: Functional architecture 1.01," O-RAN.WG2.Non-RT-RIC-ARCH-TR-v01.01 Technical Report, Jun. 2021 (Year: 2021).*
(Continued)

*Primary Examiner* — Brendan Y Higa
(74) *Attorney, Agent, or Firm* — Sughrue Mion, PLLC

(57) ABSTRACT

A radio access network control apparatus has at least one processor that performs: by a virtual infrastructure information acquisition unit, acquiring virtual infrastructure information from a virtual infrastructure that virtually manages a set of a plurality of radio access network nodes; and by a virtual infrastructure information provision unit, providing the virtual infrastructure information to the rApp through the R1 interface in the Non-RT RIC (Non-Real Time RAN Intelligent Controller) of the O-RAN. The virtual infrastructure information acquisition unit is provided in the SMO (Service Management and Orchestration) including the Non-RT RIC, and acquires the virtual infrastructure information from the virtual infrastructure through the O2 inter-
(Continued)

face. The virtual infrastructure information includes information on at least one of configuration and telemetry of the virtual infrastructure.

10 Claims, 4 Drawing Sheets

(51) Int. Cl.
*H04L 41/0895* (2022.01)
*H04L 41/342* (2022.01)
*H04L 41/40* (2022.01)
*H04W 24/02* (2009.01)

(52) U.S. Cl.
CPC ............ *H04L 41/342* (2022.05); *H04L 41/40* (2022.05); *H04W 24/02* (2013.01)

(58) Field of Classification Search
CPC ......... H04L 43/06–0817; H04L 47/822; H04L 41/04; H04L 41/052; H04L 41/0893–0895; H04L 41/34–342; H04W 4/50; H04W 24/00–10; H04W 24/02
See application file for complete search history.

(56) References Cited

U.S. PATENT DOCUMENTS

2021/0385686 A1* 12/2021 Ahmed ................. H04W 28/06
2022/0012645 A1* 1/2022 Ying ...................... G06N 20/20
2023/0040563 A1* 2/2023 Pinheiro ............... H04W 40/02
2023/0129575 A1* 4/2023 Chou .................... H04W 24/02 370/329
2023/0318794 A1* 10/2023 Shankaranarayanan ..................... H04W 72/0453 370/329
2024/0106709 A1* 3/2024 Shete ...................... H04L 41/16
2024/0107442 A1* 3/2024 Luthra ................ H04L 41/0816
2024/0121049 A1* 4/2024 Jeong .................... H04W 76/38
2024/0196178 A1* 6/2024 Ying ....................... H04W 8/18
2024/0259879 A1* 8/2024 Ranganath ............... G06N 5/01
2024/0267753 A1* 8/2024 Shete .................... H04W 24/02

OTHER PUBLICATIONS

O-RAN Working Group 2 Non-RT RIC: Functional Architecture, O-RAN, WG2. Non-RT-RIC-ARCH-TR-v01.01, Jun. 2021.

International Search Report for PCT/JP2022/019352 dated Aug. 9, 2022.

O-RAN Alliance, "O-RAN Working Group 2 Non-RT RIC: Functional Architecture", O-RAN.WG2.Non-RT-RIC-ARCH-TR-v01.01, Technical Report (This is a re-published version of the attached final specification), 2021, pp. 1-51 (53 pages total).

O-RAN Alliance, "O-RAN Minimum Viable Plan and Acceleration towards Commercialization", White Paper, 2021, pp. 1-26.

* cited by examiner

PROVISION OF VIRTUAL INFRASTRUCTURE INFORMATION THROUGH R1 INTERFACE

CROSS REFERENCE TO RELATED APPLICATIONS

This application is a National Stage of International Application No. PCT/JP2022/019352 filed Apr. 28, 2022.

BACKGROUND OF THE INVENTION

1. Field of the Invention

The present disclosure relates to provision of virtual infrastructure information through an R1 interface.

2. Description of the Related Art

For the purpose of the so-called open radio access network (RAN) in a mobile communication system, “Open RAN”, “O-RAN”, “VRAN” etc. are being considered. In this specification, “O-RAN” is used as a comprehensive term for such various “open radio access networks”. Therefore, the interpretation of “O-RAN” in this specification is not limited to the standard and/or the specification of the same name “O-RAN” specified by the O-RAN Alliance. In an O-RAN, a virtual infrastructure also referred to as O-Cloud that virtually manages a set of a plurality of radio access network nodes (RAN nodes) is provided.

Patent Literature 1: JP-A-2021-83058

SUMMARY OF THE INVENTION

A controller of the O-RAN comprises a Non-RT RIC (Non-Real Time RAN Intelligent Controller) and a Near-RT RIC (Near-Real Time RAN Intelligent Controller). The Non-RT RIC, which has a relatively long control cycle (e.g. 1 second or longer), executes application software called rApp. The Near-RT RIC, which has a relatively short control cycle (e.g. shorter than 1 second), executes application software called xApp. Among these controllers, the Non-RT RIC is responsible for overall control of the O-RAN. Nevertheless, a mechanism to provide information from the virtual infrastructure (O-Cloud) to the rApp of the Non-RT RIC has not been sufficiently defined in the conventional O-RAN.

The present disclosure was made in view of these circumstances, and its purpose is to provide a radio access network control apparatus and the like that can provide information from the virtual infrastructure to the rApp of the Non-RT RIC.

In order to solve the above problem, a radio access network control apparatus in a certain aspect of the present disclosure comprises at least one processor that performs: by a virtual infrastructure information acquisition unit, acquiring virtual infrastructure information from a virtual infrastructure that virtually manages a set of a plurality of radio access network nodes; and by a virtual infrastructure information provision unit, providing the virtual infrastructure information to the rApp through the R1 interface in the Non-RT RIC (Non-Real Time RAN Intelligent Controller) of the O-RAN.

According to this aspect, the virtual infrastructure information from the virtual infrastructure can be provided to the rApp, through the R1 interface in the Non-RT RIC.

Another aspect of the present disclosure is a radio access network control method. The method comprises: acquiring virtual infrastructure information from a virtual infrastructure that virtually manages a set of a plurality of radio access network nodes; and providing the virtual infrastructure information to the rApp through the R1 interface in the Non-RT RIC (Non-Real Time RAN Intelligent Controller) of the O-RAN.

Further another aspect of the present disclosure is a computer-readable medium. The computer-readable medium stores a radio access network control program causing a computer to perform: acquiring virtual infrastructure information from a virtual infrastructure that virtually manages a set of a plurality of radio access network nodes; and providing the virtual infrastructure information to the rApp through the R1 interface in the Non-RT RIC (Non-Real Time RAN Intelligent Controller) of the O-RAN.

In addition, any combination of the above components, and any conversion of the expression of the present disclosure among methods, devices, systems, recording media, computer programs and the like are also encompassed within this disclosure.

According to the present disclosure, information from the virtual infrastructure can be provided to the rApp of the Non-RT RIC.

DETAILED DESCRIPTION OF THE INVENTION

In the following, the present embodiment is described in accordance with the “O-RAN” which is the standard and/or the specification developed by the O-RAN Alliance. Therefore, the known terms defined in “O-RAN” will be used in the present embodiment just for convenience, but the technologies according to this disclosure can be applied to other existing radio access networks such as “Open RAN” and “VRAN” and/or to similar radio access networks that may be developed in the future.

Figure 1:
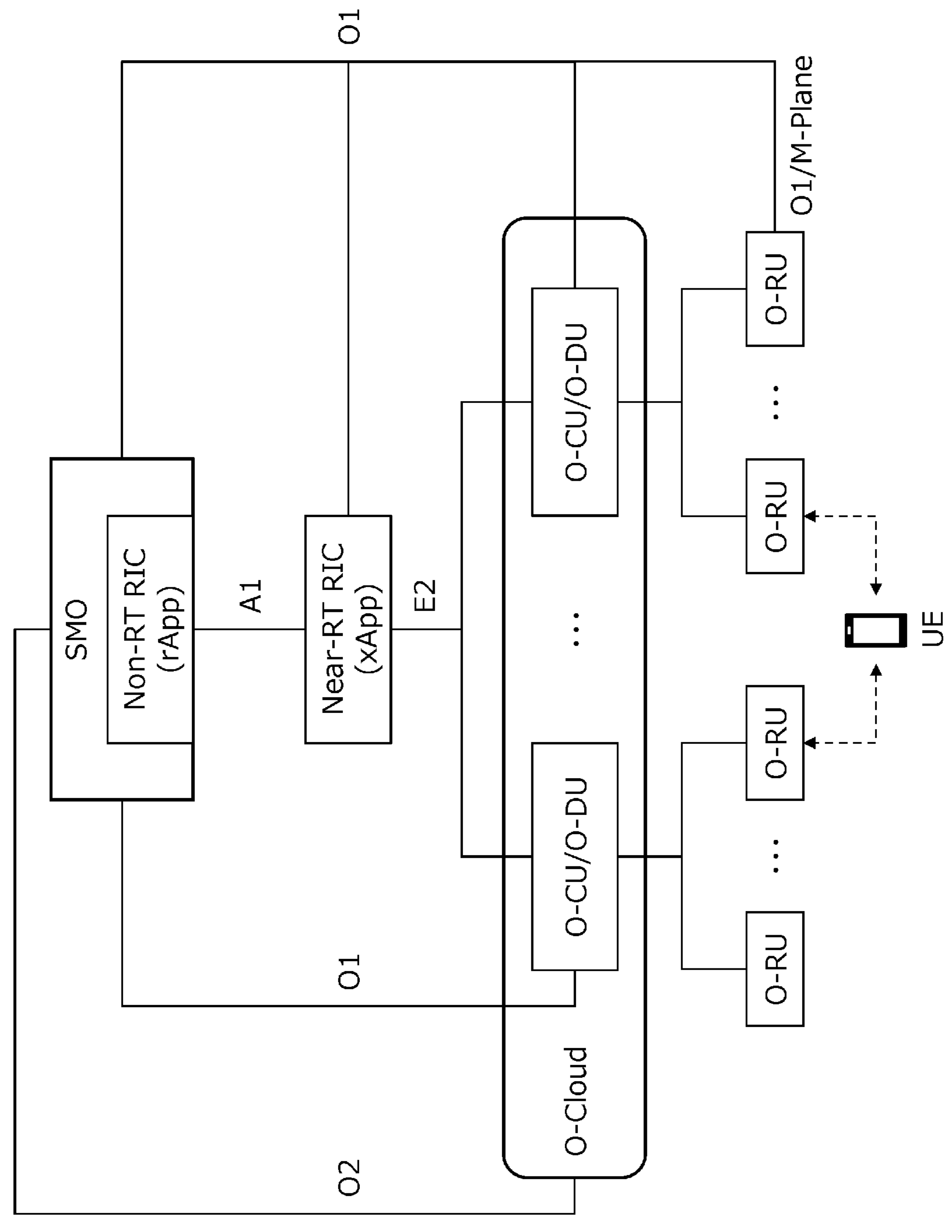
FIG. 1 is a schematic overview of a radio access network control apparatus.

FIG. 1 shows a schematic overview of the radio access network control apparatus according to the present embodiment. This radio access network control apparatus is a RAN control apparatus that controls radio access network in accordance with the O-RAN. The SMO (Service Management and Orchestration) controls the entire RAN control apparatus or the entire O-RAN and coordinates the operations of each portion. The SMO is equipped with a Non-RT RIC (Non-Real Time RAN Intelligent Controller) that functions as the overall control processor responsible for overall control. The Non-RT RIC, which has a relatively long control cycle (e.g. 1 second or longer), issues guidelines, policies, guidance etc. concerning the operation of each RAN node (O-CU and/or O-DU as described below). Specifically, the Non-RT RIC executes application software called rApp to issue operational policy for each RAN node to the Near-RT RIC (Near-Real Time RAN Intelligent Controller) through the A1 interface. The Near-RT RIC, which has a relatively short control cycle (e.g. shorter than 1 second), executes application software called xApp to control each RAN node (O-CU/O-DU) itself and/or general-purpose hardware etc. in the radio unit (O-RU) connected to each of the RAN nodes through the E2 interface.

The illustrated RAN node has an O-CU, which is an O-RAN compliant central unit (CU), and/or O-DU, which is an O-RAN compliant distributed unit (DU). Both of the O-CU and the O-DU are responsible for baseband processing in the O-RAN, where the O-CU is provided on the side of the core network (not shown in the figure), and the O-DU is provided on the side of the O-RU, which is an O-RAN compliant radio unit (RU). The O-CU may be divided into the O-CU-CP, which constitutes the control plane (CP), and the O-CU-UP, which constitutes the user plane (UP). The O-CU and the O-DU may be integrally configured as a single baseband processing unit. The O-eNB as a base station compliant with the O-RAN and the 4th generation mobile communication system (4G), may be provided as a RAN node. One or more O-RUs are connected to each RAN node (O-CU/O-DU) and are controlled by the Near-RT RIC via each of the RAN nodes. A communication device (UE: User Equipment) in the communication cell provided by each O-RU can be connected to each of the O-RUs, and can perform mobile communication with the core network (not shown) via each RAN node (O-CU/O-DU).

Each RAN node (O-CU/O-DU) and the Near-RT RIC provide operational data etc. of each RAN node, each O-RU and each UE through the O1 interface to the SMO for so-called FCAPS (Fault, Configuration, Accounting, Performance, Security). The SMO updates as necessary the operational policy for each RAN node issued by the Non-RT RIC to the Near-RT RIC through the A1 interface, based on the operational data acquired through the O1 interface. The O-RUs may be connected to the SMO for the FCAPS by the O1 interface and/or other interfaces (e.g. Open Fronthaul M-Plane).

The O-Cloud as a virtual infrastructure that virtually manages a set of the plurality of RAN nodes (O-CUs/O-DUs) is connected to the SMO by an O2 interface. The SMO generates a resource allocation policy concerning the resource allocation and/or a workload management policy concerning the workload management of the plurality of RAN nodes, based on the operational states of the plurality of RAN nodes (O-CUs/O-DUs) acquired from the O-Cloud through the O2 interface, and issues them to the O-Cloud through the O2 interface.

Figure 2:
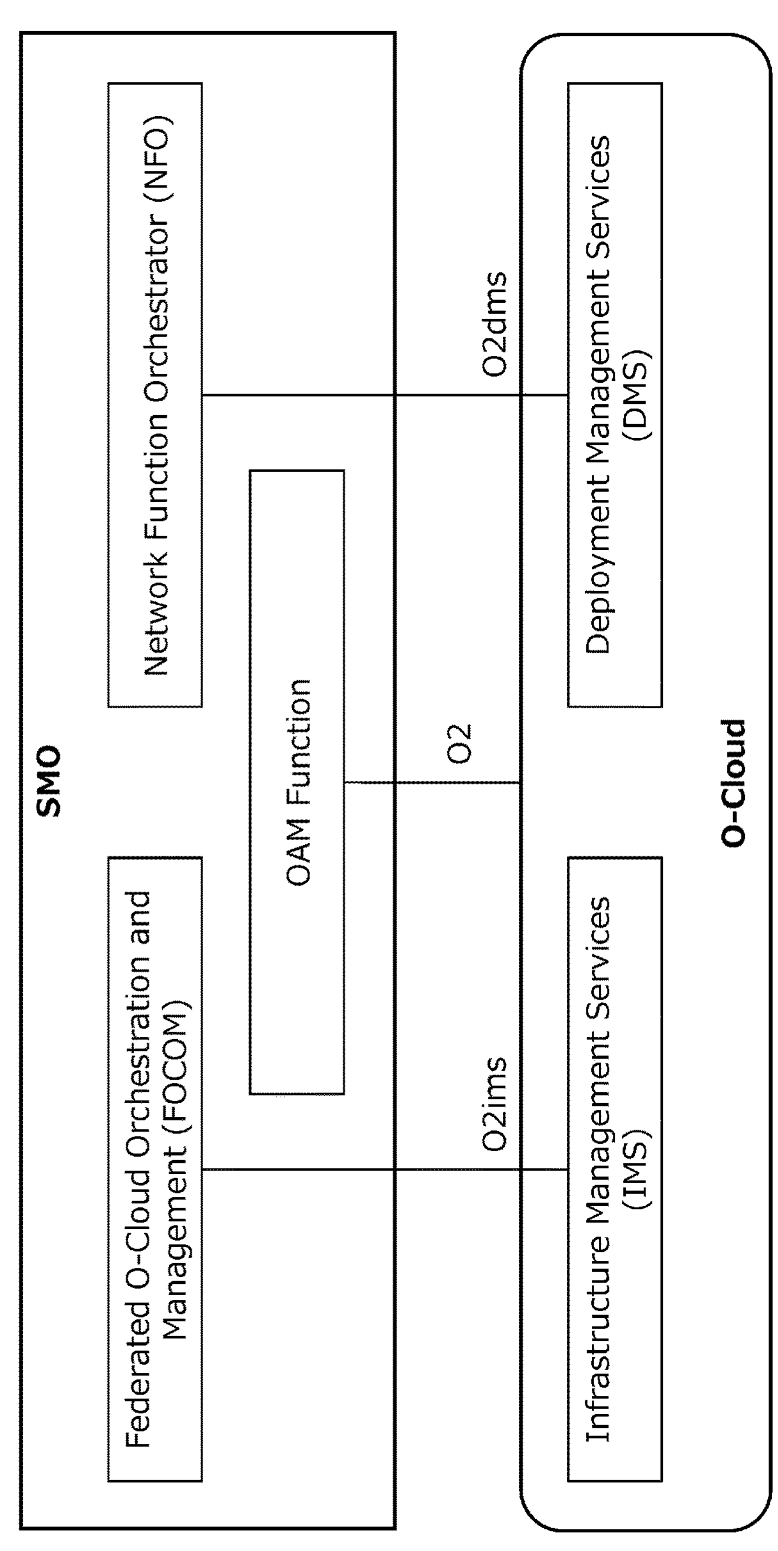
FIG. 2 schematically shows various functions realized in the SMO and/or the Non-RT RIC and O-Cloud.

FIG. 2 schematically shows the various functions realized in the SMO and/or the Non-RT RIC and the O-Cloud. In the SMO, three main functions are realized, which are the FOCOM (Federated O-Cloud Orchestration and Management), the NFO (Network Function Orchestrator) and the OAM Function. In the O-Cloud, two main functions are realized, which are the IMS (Infrastructure Management Services) and the DMS (Deployment Management Services).

The FOCOM manages resources in the O-Cloud, while receiving services from the IMS of the O-Cloud through the O2 interface (O2ims). The NFO realizes the orchestrated operation of a set of network functions (NFs) by a plurality of NF Deployments in the O-Cloud, while receiving services from the DMS of the O-Cloud through the O2 interface (O2dms). The NFO may utilize the OAM Function to access the deployed NFs through the O1 interface. The OAM Function is responsible for the FCAPS management of O-RAN managed entities such as the RAN nodes. The OAM Function in the present embodiment can be a functional block where callbacks are provided for receiving data concerning failures and/or operational states of the plurality of RAN nodes that are virtually managed by the O-Cloud, by monitoring processes or procedures over the O2ims and/or the O2dms. The IMS is responsible for managing the O-Cloud resources (hardware) and/or the software used for managing them, and provides services primarily to the FOCOM of the SMO. One or more DMSs are responsible for the management of the plurality of NF Deployments in the O-Cloud, specifically the initiation, monitoring, termination etc., and provides services primarily to the NFO of the SMO.

Figure 3:
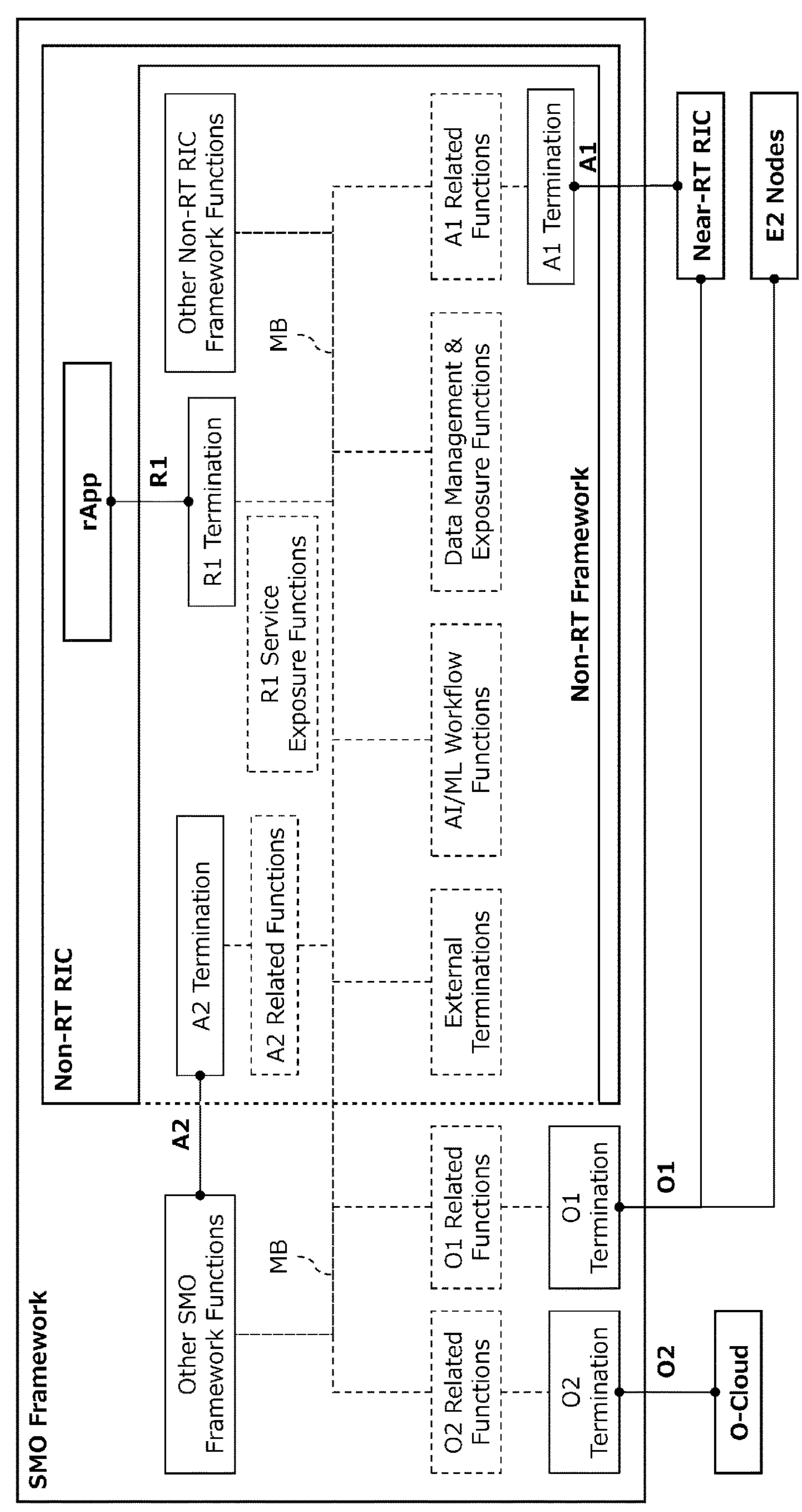
FIG. 3 is a schematic representation of structures and/or functions inside the SMO and/or the Non-RT RIC.

FIG. 3 is a schematic representation of structures and/or functions inside the SMO and/or the Non-RT RIC. The SMO or the SMO framework includes the Non-RT RIC. Inside the Non-RT RIC is divided into the Non-RT framework or the Non-RT RIC framework and the rApp. The solid lines in this figure represent functional blocks and/or connections defined in the O-RAN. The dotted lines in this figure represent functional blocks and/or connections that can be implemented in the O-RAN.

In the SMO framework excluding the Non-RT RIC, the O1 Termination, the O1 Related Functions, the O2 Termination, the O2 Related Functions, and the Other SMO Framework Functions are provided. The O1 Termination is the termination of the O1 interface in the SMO framework. As also shown in FIG. 1, the O1 Termination is connected to the Near-RT RIC and/or the E2 nodes (RAN nodes such as O-CUs/O-DUs, O-RU etc.) via the O1 interface. The O1 Related Functions directly connected the O1 Termination provide various functions related to the O1 interface, the Near-RT RIC, the E2 node etc. The O2 Termination is the termination of the O2 interface in the SMO framework. As also shown in FIG. 1, the O2 Termination is connected to the O-Cloud via the O2 interface. The O2 Related Functions directly connected the O2 Termination provide various functions related to the O2 interface, the O-Cloud etc. The Other SMO Framework Functions provide other functions except for the O1 Related Functions and the O2 Related Functions. The Other SMO Framework Functions are connected to the A2 Termination (described below) in the Non-RT RIC via the A2 interface. Various functions of the SMO framework such as the O1 Related Functions, the O2 Related Functions, and the Other SMO Framework Functions, are connected to the main bus MB extending also inside the Non-RT RIC. Each of these functional blocks can exchange data with other functional blocks inside and outside the SMO framework (or inside and outside the Non-RT RIC) through the main bus MB.

In the Non-RT framework, which is the area of the Non-RT RIC excluding the rApp, the A1 Termination, the A1 Related Functions, the A2 Termination, the A2 Related Functions, the R1 Termination, the R1 Service Exposure Functions, the External Terminations, the Data Management & Exposure Functions, the AI (Artificial Intelligence)/ML (Machine Learning) Workflow Functions, and the Other Non-RT RIC Framework Functions are provided.

The A1 Termination is the termination of the A1 interface in the Non-RT framework. As also shown in FIG. 1, the A1 Termination is connected to the Near-RT RIC via the A1 interface. The A1 Related Functions directly connected the A1 Termination provide various functions related to the A1 interface, the Near-RT RIC etc. The A2 Termination is the termination of the A2 interface in the Non-RT framework. The A2 Termination is connected to the Other SMO Framework Functions of the SMO framework via the A2 interface. The A2 Related Functions directly connected the A2 Termination provide various functions related to the A2 interface, the Other SMO Framework Functions etc.

The R1 Termination is the termination of the R1 interface in the Non-RT framework. The R1 Termination is connected to the rApp running on the Non-RT RIC via the R1 interface. In other words, the R1 interface constitutes the API (Application Programming Interface) for the rApp. The R1 Service Exposure Functions accompanying the R1 Termination provide the function of disclosing data related to services such as the R1 interface and the rApp to the main bus MB etc. and/or provide the function of disclosing data from the main bus MB etc. to the R1 Termination etc. for services such as the R1 interface and the rApp. The External Terminations are terminations of various external interfaces (not shown) in the Non-RT framework.

The Data Management & Exposure Functions manage various data on the main bus MB, and provide the function of disclosing them in a manner in accordance with the access right of each functional block. The AI/ML Workflow Functions provide the function of managing workflows executed using the artificial intelligence (AI) capability and/or the machine learning (ML) capability implemented in the Non-RT RIC and/or the Near-RT RIC. The Other Non-RT RIC Framework Functions provide other functions except for the above various Non-RT framework functions. Various functions of the Non-RT framework such as the A1 Related Functions, the A2 Related Functions, the R1 Termination, the R1 Service Exposure Functions, the External Terminations, the Data Management & Exposure Functions, the AI/ML Workflow Functions, and the Other Non-RT RIC Framework Functions, are connected to the main bus MB extending also outside the Non-RT RIC. Each of these functional blocks can exchange data with other functional blocks inside and outside the Non-RT RIC through the main bus MB.

Figure 4:
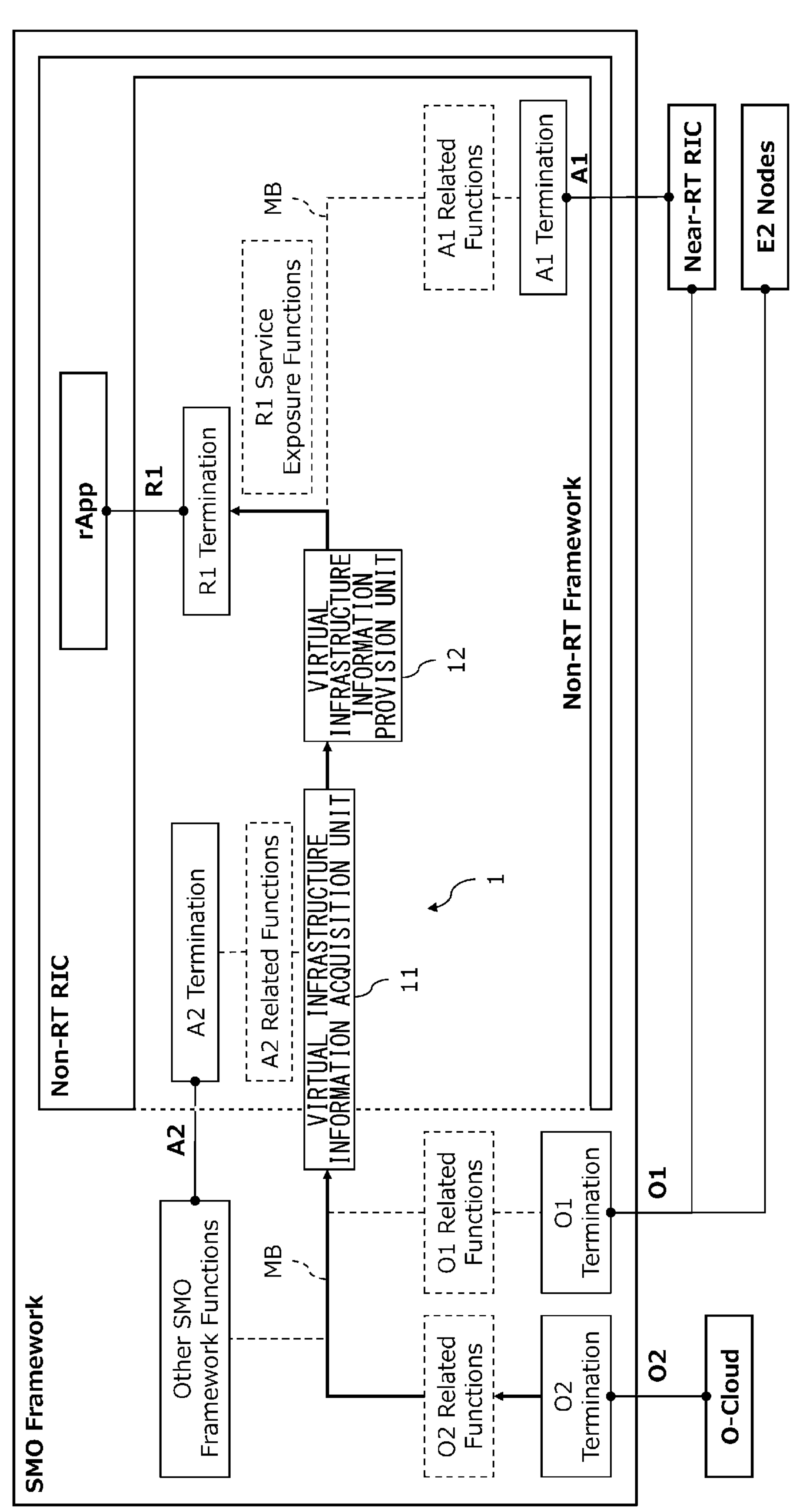
FIG. 4 is a functional block diagram schematically showing a radio access network control apparatus.

FIG. 4 is a functional block diagram schematically showing the radio access network control apparatus 1 according to the present embodiment. The radio access network control apparatus 1 is provided in the SMO framework and/or the Non-RT framework in FIG. 3. In this figure, some functional blocks in FIG. 3 (specifically, the External Terminations, the Data Management & Exposure Functions, the AI/ML Workflow Functions, and the Other Non-RT RIC Framework Functions) are omitted.

The radio access network control apparatus 1 comprises a virtual infrastructure information acquisition unit 11 and a virtual infrastructure information provision unit 12. These functional blocks are realized by the cooperation of hardware resources, such as the central processing unit, memory, input devices, output devices, and peripheral devices connected to the computer, and software that is executed using them. Regardless of the type of computer or its installation location, each of the above functional blocks may be realized with the hardware resources of a single computer, or by combining hardware resources distributed across plurality of computers. Especially in the present embodiment, some or all of the functional blocks of the radio access network control apparatus 1 may be realized in a processor provided in the SMO and/or the Non-RT RIC, or may be realized in a computer and/or a processor provided outside the SMO and/or the Non-RT RIC in a distributed manner or a centralized manner.

The virtual infrastructure information acquisition unit 11 acquires virtual infrastructure information from the O-Cloud as a virtual infrastructure. Specifically, the virtual infrastructure information acquisition unit 11 is provided in the SMO including the Non-RT RIC, and acquires the virtual infrastructure information from the O-Cloud through the O2 interface. Although concrete examples are described below, the virtual infrastructure information includes information on at least one of configuration and telemetry of the O-Cloud. The virtual infrastructure information acquisition unit 11 in FIG. 4 is shown schematically on the main bus MB, spanning inside and outside the Non-RT framework. However, the virtual infrastructure information acquisition unit 11 can be provided in whole or in part within the SMO framework outside the Non-RT framework. Besides, as long as the virtual infrastructure information acquisition unit 11 can access the relevant functional blocks within the SMO, specifically the O2 Termination, the O2 Related Functions, the virtual infrastructure information provision unit 12 etc., it does not have to be directly connected to the main bus MB. Among these relevant functional blocks, the O2 Related Functions inside the SMO framework (outside the Non-RT framework) is the most relevant, where some or all of the functions of the virtual infrastructure information acquisition unit 11 are preferably realized.

The virtual infrastructure information provision unit 12 provides the virtual infrastructure information acquired by the virtual infrastructure information acquisition unit 11 to the rApp through the R1 interface in the Non-RT RIC. The virtual infrastructure information provision unit 12 in FIG. 4 is shown schematically on the main bus MB inside the Non-RT framework. However, virtual infrastructure information provision unit 12 can be provided in whole or in part within the Non-RT framework. Besides, as long as the virtual infrastructure information provision unit 12 can access the relevant functional blocks within the SMO, specifically the virtual infrastructure information acquisition unit 11, the R1 Termination, the R1 Service Exposure Functions etc., it does not have to be directly connected to the main bus MB. Among these relevant functional blocks, the R1 Service Exposure Functions inside the Non-RT framework is the most relevant, where some or all of the functions of the virtual infrastructure information provision unit 12 are preferably realized.

As shown schematically by the arrows in FIG. 4, the virtual infrastructure information acquisition unit 11 in the SMO framework, acquires the virtual infrastructure information from the O-Cloud, through the O2 interface, the O2 Termination, the O2 Related Functions, the main bus MB etc. The virtual infrastructure information provision unit 12 in the Non-RT framework, provides the virtual infrastructure information acquired by the virtual infrastructure information acquisition unit 11 to the rApp, through the main bus MB, the R1 Service Exposure Functions, the R1 Termination, the R1 interface etc. According to the present embodiment, the virtual infrastructure information from the O-Cloud can be provided to the rApp, through the R1 interface in the Non-RT RIC.

Shown below are the concrete examples of the virtual infrastructure information that the virtual infrastructure information acquisition unit 11 can acquire from the O-Cloud through the O2 interface.

In the first concrete example, the virtual infrastructure information acquisition unit 11 realized by the O2 Related Functions inside the SMO framework (outside the Non-RT framework), acquires the virtual infrastructure information from the IMS of the O-Cloud through a query to the IMS over the O2 interface ("O2ims" in FIG. 2). Through various O2ims queries which are specifically exemplified below, the virtual infrastructure information acquisition unit 11 can acquire the virtual infrastructure information concerning configuration and/or telemetry of the O-Cloud from the IMS, and can provide them to the rApp via the virtual infrastructure information provision unit 12 and the R1 interface.

By the first O2ims query "Query O2ims_Infrastructure Inventory related Services", the information on infrastructure resource inventory and management service of the O-Cloud can be acquired by the virtual infrastructure information acquisition unit 11, from the IMS of the O-Cloud through the O2 interface (O2ims). This virtual infrastructure information is related to the configuration of the O-Cloud.

By the second O2ims query "Query O2ims_Infrastructure Monitoring related Services", the information on telemetry reporting can be acquired by the virtual infrastructure information acquisition unit 11, from the IMS of the O-Cloud through the O2 interface (O2ims). This virtual infrastructure information is related to the telemetry of the O-Cloud.

By the third O2ims query "Query O2ims_Infrastructure Provisioning Services", the information on provisioning service of the O-Cloud can be acquired by the virtual infrastructure information acquisition unit 11, from the IMS of the O-Cloud through the O2 interface (O2ims). This virtual infrastructure information is related to the configuration of the O-Cloud.

By the fourth O2ims query "Query O2ims_Infrastructure LifecycleManagement Services", the information on procedural support for automation of lifecycle events of the O-Cloud, can be acquired by the virtual infrastructure information acquisition unit 11, from the IMS of the O-Cloud through the O2 interface (O2ims). This virtual infrastructure information is related to the configuration of the O-Cloud.

In the second concrete example, the virtual infrastructure information acquisition unit 11 realized by the O2 Related Functions inside the SMO framework (outside the Non-RT framework), acquires the virtual infrastructure information from the DMS of the O-Cloud through a query to the DMS over the O2 interface ("O2dms" in FIG. 2). Through various O2dms queries which are specifically exemplified below, the virtual infrastructure information acquisition unit 11 can acquire the virtual infrastructure information concerning configuration and/or telemetry of the O-Cloud from one or more DMSs, and can provide them to the rApp via the virtual infrastructure information provision unit 12 and the R1 interface.

By the first O2dms query "Query O2dms_Deployment Inventory related Services", the information on inventory details of various NF Deployments can be acquired by the virtual infrastructure information acquisition unit 11, from the DMS of the O-Cloud through the O2 interface (O2dms). This virtual infrastructure information is related to the configuration of the O-Cloud.

By the second O2dms query "Query O2dms_Deployment Monitoring related Services", the information on telemetry reporting of each NF Deployment can be acquired by the virtual infrastructure information acquisition unit 11, from the DMS of the O-Cloud through the O2 interface (O2dms). This virtual infrastructure information is related to the telemetry of the O-Cloud.

By the third O2dms query "Query O2dms_Infrastructure LifecycleManagement Services", the information on procedural support for automation of lifecycle events of the NF Deployment, can be acquired by the virtual infrastructure information acquisition unit 11, from the DMS of the O-Cloud through the O2 interface (O2dms). This virtual infrastructure information is related to the configuration of the O-Cloud.

The present disclosure has been described above based on embodiments. It is obvious to those skilled in the art that various variations are possible in the combination of each component and/or each process in the exemplary embodiments, and that such variations are also encompassed within the scope of the present disclosure.

It should be noted that the structures, the operations, and the functions of each apparatus and/or each method described in the embodiments can be realized by hardware resources or software resources, or by the cooperation of hardware resources and software resources. As hardware resources, for example, processors, ROMs, RAMs and various integrated circuits can be used. As software resources, for example, programs such as operating systems and applications can be used.

The present disclosure may be expressed as the following items.

1. A radio access network control apparatus comprising at least one processor that performs:

by a virtual infrastructure information acquisition unit, acquiring virtual infrastructure information from a virtual infrastructure that virtually manages a set of a plurality of radio access network nodes; and by a virtual infrastructure information provision unit, providing the virtual infrastructure information to the rApp through the R1 interface in the Non-RT RIC (Non-Real Time RAN Intelligent Controller) of the O-RAN.

2. The radio access network control apparatus according to item 1, wherein the virtual infrastructure information acquisition unit is provided in the SMO (Service Management and Orchestration) including the Non-RT RIC, and acquires the virtual infrastructure information from the virtual infrastructure through the O2 interface.

3. The radio access network control apparatus according to item 1 or 2, wherein the virtual infrastructure information includes information on at least one of configuration and telemetry of the virtual infrastructure.

4. The radio access network control apparatus according to any of items 1 to 3, wherein the virtual infrastructure is the O-Cloud of the O-RAN.

5. The radio access network control apparatus according to item 4, wherein the virtual infrastructure information acquisition unit acquires the virtual infrastructure information from the IMS (Infrastructure Management Services) of the O-Cloud through a query to the IMS.

6. The radio access network control apparatus according to item 4 or 5, wherein the virtual infrastructure information acquisition unit acquires the virtual infrastructure information from the DMS (Deployment Management Services) of the O-Cloud through a query to the DMS.

7. A radio access network control method comprising: acquiring virtual infrastructure information from a virtual infrastructure that virtually manages a set of a plurality of radio access network nodes; and providing the virtual infrastructure information to the rApp through the R1 interface in the Non-RT RIC (Non-Real Time RAN Intelligent Controller) of the O-RAN.

8. A computer-readable medium storing a radio access network control program causing a computer to perform:

acquiring virtual infrastructure information from a virtual infrastructure that virtually manages a set of a plurality of radio access network nodes; and providing the virtual infrastructure information to the rApp through the R1 interface in the Non-RT RIC (Non-Real Time RAN Intelligent Controller) of the O-RAN.

The present disclosure relates to provision of virtual infrastructure information through an R1 interface.

1 radio access network control apparatus, 11 virtual infrastructure information acquisition unit, 12 virtual infrastructure information provision unit.

What is claimed is:

1. A radio access network control apparatus comprising at least one processor that performs:

by a virtual infrastructure information acquisition unit, acquiring virtual infrastructure information from a virtual infrastructure that virtually manages a set of a plurality of radio access network nodes; and by a virtual infrastructure information provision unit, providing the virtual infrastructure information to an rApp through an R1 interface in a Non-RT RIC (Non-Real Time RAN Intelligent Controller) of an O-RAN (Open-Radio Access Network), wherein the virtual infrastructure information acquisition unit is a SMO (Service Management and Orchestration) function, distinct from a FOCOM (Federated O-Cloud Orchestration and Management) function and an NFO (Network Function Orchestration) function of an SMO framework, and included in the SMO framework at least partially external to a Non-RT RIC framework including the Non-RT RIC, and wherein the virtual infrastructure information provision unit is included at least partially in the Non-RT RIC framework, and is distinct from an R1 Service Exposure Function of the Non-RT RIC framework.

2. The radio access network control apparatus according to claim 1, wherein the virtual infrastructure information acquisition unit is provided in the SMO (Service Management and Orchestration) including the Non-RT RIC, and acquires the virtual infrastructure information from the virtual infrastructure through an O2 interface.

3. The radio access network control apparatus according to claim 1, wherein the virtual infrastructure information includes information on at least one of configuration and telemetry of the virtual infrastructure.

4. The radio access network control apparatus according to claim 1, wherein the virtual infrastructure is an O-Cloud of the O-RAN.

5. The radio access network control apparatus according to claim 4, wherein the virtual infrastructure information acquisition unit acquires the virtual infrastructure information from an IMS (Infrastructure Management Services) of the O-Cloud through a query to the IMS.

6. The radio access network control apparatus according to claim 4, wherein the virtual infrastructure information acquisition unit acquires the virtual infrastructure information from a DMS (Deployment Management Services) of the O-Cloud through a query to the DMS.

7. A radio access network control method comprising:

acquiring virtual infrastructure information from a virtual infrastructure that virtually manages a set of a plurality of radio access network nodes; and providing the virtual infrastructure information to an rApp through an R1 interface in a Non-RT RIC (Non-Real Time RAN Intelligent Controller) of an O-RAN (Open-Radio Access Network), wherein the virtual infrastructure information acquisition unit is a SMO (Service Management and Orchestration) function, distinct from a FOCOM (Federated O-Cloud Orchestration and Management) function and an NFO (Network Function Orchestration) function of an SMO framework, and included in the SMO framework at least partially external to a Non-RT RIC framework including the Non-RT RIC, and wherein the virtual infrastructure information provision unit is included at least partially in the Non-RT RIC framework, and is distinct from an R1 Service Exposure Function of the Non-RT RIC framework.

8. A non-transitory computer-readable medium storing a radio access network control program causing a computer to perform:

acquiring virtual infrastructure information from a virtual infrastructure that virtually manages a set of a plurality of radio access network nodes; and providing the virtual infrastructure information to an rApp through an R1 interface in a Non-RT RIC (Non-Real Time RAN Intelligent Controller) of an O-RAN (Open-Radio Access Network), wherein the virtual infrastructure information acquisition unit is a SMO (Service Management and Orchestration) function, distinct from a FOCOM (Federated O-Cloud Orchestration and Management) function and an NFO (Network Function Orchestration) function of an SMO framework, and included in the SMO framework at least partially external to a Non-RT RIC framework including the Non-RT RIC, and wherein the virtual infrastructure information provision unit is included at least partially in the Non-RT RIC framework, and is distinct from an R1 Service Exposure Function of the Non-RT RIC framework.

9. The radio access network control apparatus according to claim 4, wherein the virtual infrastructure information acquisition unit acquires the virtual infrastructure information through any of a plurality of predetermined queries, the plurality of predetermined queries comprising:

an infrastructure inventory related services query to query an IMS of the O-Cloud via an O2 interface for information on infrastructure resource inventory of the O-Cloud; and an infrastructure monitoring related services query to query the IMS via the O2 interface for information on infrastructure telemetry of the O-Cloud.

10. The radio access network control apparatus according to claim 4, wherein the virtual infrastructure information acquisition unit acquires the virtual infrastructure information through any of a plurality of predetermined queries, the plurality of predetermined queries comprising:

a network function deployment inventory related services query to query a DMS of the O-Cloud via an O2 interface for information on network function (NF) deployments of the O-Cloud; and a network function monitoring related services query to query the DMS via the O2 interface for information on NF deployment telemetry of the O-Cloud.

* * * * *